United States Patent
Rey et al.

(10) Patent No.: US 8,691,034 B2
(45) Date of Patent: Apr. 8, 2014

(54) METHOD AND APPARATUS FOR FORMING A TIRE COMPONENT UPON AN AXIALLY TAPERED SURFACE

(75) Inventors: Daniel Rey, Greer, SC (US); Larry Satterfield, Moore, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/132,913

(22) PCT Filed: Dec. 5, 2008

(86) PCT No.: PCT/US2008/085732
§ 371 (c)(1),
(2), (4) Date: Jun. 3, 2011

(87) PCT Pub. No.: WO2010/065042
PCT Pub. Date: Jun. 10, 2010

(65) Prior Publication Data
US 2011/0232830 A1    Sep. 29, 2011

(51) Int. Cl.
*B29D 30/16*    (2006.01)
*B29D 30/72*    (2006.01)

(52) U.S. Cl.
USPC .................... 156/117; 156/130.7; 156/406.4

(58) Field of Classification Search
USPC ........... 156/112, 116, 117, 130, 130.3, 130.7, 156/397, 405.1, 406.4
See application file for complete search history.

(56) References Cited

U.S. PATENT DOCUMENTS

| | | |
|---|---|---|
| 1,548,156 A | 8/1925 | Mixsell |
| 2,712,852 A | 7/1955 | Carter |
| 3,223,573 A | 12/1965 | Deist |
| 3,251,722 A | 5/1966 | Holman |
| 3,485,128 A | 12/1969 | Siegenthaler |

(Continued)

FOREIGN PATENT DOCUMENTS

| | | |
|---|---|---|
| CN | 1713981 A | 12/2005 |
| DE | 2740609 A1 | 3/1979 |

(Continued)

OTHER PUBLICATIONS

PCT/US2008/085732 International Search Report and Written Opinion dated Jun. 7, 2010, 15 pgs.

(Continued)

*Primary Examiner* — Geoffrey L Knable
(74) *Attorney, Agent, or Firm* — Hahn Loeser & Parks LLP

(57) ABSTRACT

The present invention includes methods and apparatus (10) for forming a tire component upon an axially tapered building surface (100). In particular embodiments, such methods include the step of providing a mechanical system, the system including a plurality of cutting members (42) and an application surface (64) for transferring material to the axially tapered building surface, the axially tapered surface comprising a surface of revolution that varies radially along a rotational axis of the surface. Particular embodiments may also include translating a sheet of material along a translation path through the mechanical system, and cutting a strip of material from the sheet with one or more of the plurality of cutting members during the step of translating. Particular embodiments may further include mechanically transferring the strip of material from the application surface to the axially tapered building surface, the axially tapered building surface rotating about an axis of rotation during the step of translating.

10 Claims, 10 Drawing Sheets

(56) References Cited

U.S. PATENT DOCUMENTS

| | | | |
|---|---|---|---|
| 3,580,781 A | 5/1971 | Hollis et al. | |
| 3,595,724 A | 7/1971 | LeBlond | |
| 3,607,556 A * | 9/1971 | Appleby et al. | 156/406.4 |
| 3,607,557 A | 9/1971 | Casey et al. | |
| 3,779,834 A | 12/1973 | Appleby et al. | |
| 3,855,030 A | 12/1974 | Schelkmann | |
| 4,222,810 A | 9/1980 | Ytterstroem | |
| 4,266,112 A | 5/1981 | Niedermeyer | |
| 4,276,104 A | 6/1981 | Riggs | |
| 4,358,978 A | 11/1982 | Lawson | |
| 4,448,627 A * | 5/1984 | Satoh et al. | 156/405.1 |
| 4,927,482 A | 5/1990 | Capelle | |
| 5,030,079 A | 7/1991 | Benzing, II | |
| 5,059,268 A * | 10/1991 | Satoh et al. | 156/130.3 |
| 5,108,527 A | 4/1992 | Glover et al. | |
| 5,178,714 A | 1/1993 | Glover et al. | |
| 5,252,156 A | 10/1993 | Glinz | |
| 5,820,726 A | 10/1998 | Yoshida et al. | |
| 6,336,488 B1 | 1/2002 | Vannan et al. | |
| 6,364,981 B1 | 4/2002 | Smith et al. | |
| 6,379,502 B1 | 4/2002 | Satzger | |
| 6,510,881 B1 | 1/2003 | Takahashi et al. | |
| 6,699,344 B2 | 3/2004 | Sergel et al. | |
| 6,923,879 B1 | 8/2005 | Blickwedel et al. | |
| 6,979,378 B2 | 12/2005 | Okada et al. | |
| 7,052,568 B2 | 5/2006 | Tamura et al. | |
| 7,175,726 B2 | 2/2007 | Abe et al. | |
| 7,195,047 B2 | 3/2007 | Sieverding et al. | |
| 2003/0051794 A1 | 3/2003 | Suda et al. | |
| 2003/0168152 A1 | 9/2003 | Suda | |
| 2005/0116374 A1* | 6/2005 | Ogawa et al. | 264/103 |
| 2006/0048874 A1 | 3/2006 | Maruoka | |
| 2006/0048878 A1* | 3/2006 | Ogawa | 152/524 |
| 2008/0251185 A1 | 10/2008 | Cappa et al. | |
| 2009/0126874 A1 | 5/2009 | Mehlan et al. | |

FOREIGN PATENT DOCUMENTS

| | | | |
|---|---|---|---|
| DE | 19823433 C1 | 6/1999 | |
| DE | 102005046115 A1 | 3/2007 | |
| EP | 0340147 A2 | 11/1989 | |
| EP | 0419050 A2 | 3/1991 | |
| EP | 0429286 A2 | 5/1991 | |
| EP | 1293333 A2 | 3/2003 | |
| EP | 1295707 A2 | 3/2003 | |
| EP | 1486320 A1 | 12/2004 | |
| EP | 1498249 A1 | 1/2005 | |
| EP | 1541326 A1 | 6/2005 | |
| EP | 1612034 A1 | 1/2006 | |
| EP | 1625932 A2 | 2/2006 | |
| EP | 1625932 A3 | 2/2006 | |
| EP | 1977876 A1 | 10/2008 | |
| GB | 1016279 A | 1/1966 | |
| JP | 46-035970 Y1 | 12/1971 | |
| JP | 49-081487 | 8/1974 | |
| JP | 54000080 A | 1/1979 | |
| JP | 61229538 A | 10/1986 | |
| JP | 1314151 A | 12/1989 | |
| JP | 1314152 A | 12/1989 | |
| JP | 07047617 A | 2/1995 | |
| JP | 08216290 A | 8/1996 | |
| JP | 9029856 A | 4/1997 | |
| JP | 2000-108222 A | 4/2000 | |
| JP | 2001179848 A | 7/2001 | |
| JP | 2001179849 A | 7/2001 | |
| JP | 2002046194 A | 2/2002 | |
| JP | 2002-240164 A | 8/2002 | |
| JP | 2002347135 A | 12/2002 | |
| JP | 2003080615 A | 3/2003 | |
| JP | 2003103652 A | 4/2003 | |
| JP | 2003251709 A | 9/2003 | |
| JP | 2006-10856 A | 1/2006 | |
| JP | 2006007661 A | 1/2006 | |
| JP | 2006110856 A | 4/2006 | |
| JP | 2007098626 A | 4/2007 | |
| JP | 2007185886 A | 7/2007 | |
| JP | 2007-283998 A | 11/2007 | |
| JP | 2008260296 A | 10/2008 | |
| RU | 2 155 674 C2 | 9/2000 | |
| RU | 2225792 C2 | 3/2004 | |
| SU | 1369916 A1 | 1/1988 | |
| SU | 1431960 A1 | 10/1988 | |
| SU | 1705118 A1 | 1/1992 | |
| WO | 02/055289 A1 | 7/2002 | |
| WO | 02102579 A1 | 12/2002 | |
| WO | 2006025258 A1 | 3/2006 | |
| WO | 2007010591 A1 | 1/2007 | |
| WO | 2008/012126 A1 | 1/2008 | |

OTHER PUBLICATIONS

PCT/US2008/061292 International Search Report and Written Opinion dated Jan. 22, 2009, 10 pgs.
Abstract of EP 1977876 (A1) from http://ep.espacenet.com dated Jun. 22, 2011.
Abstract of WO 2006025258 (A1) from http://worldwide.espacenet.com dated Jun. 22, 2011.
Abstract of WO 2007010591 (A1) from http://worldwide.espacenet.com dated Jun. 22, 2011.
Abstract of DE 19823433 (C1) from http://worldwide.espacenet.com dated Jun. 22, 2011.
Abstract of DE 102005046115 (A1) from http://worldwide.espacenet.com dated Jun. 22, 2011.
Abstract of JP 61229538 (A) from http://worldwide.espacenet.com dated Jun. 22, 2011.
Abstract of JP 7047617 (A) from http://worldwide.espacenet.com dated Jun. 22, 2011.
Abstract of JP 8216290 (A) from http://worldwide.espacenet.com dated Jun. 22, 2011.
Abstract of JP 9029856 (A) from http://worldwide.espacenet.com dated Jun. 22, 2011.
Abstract of JP 2001-179848 from http://www19.ipdl.inpit.go.jp dated Jun. 22, 2011.
Abstract of JP 2002-046194 from http://www19.ipdl.inpit.go.jp dated Dec. 9, 2008.
Abstract of JP 2002-347135 from http://www19.ipdl.inpit.go.jp dated Dec. 9, 2008.
Abstract of JP 2003-080615 from http://www19.ipdl.inpit.go.jp dated Jun. 22, 2011.
Abstract of JP 2003-251709 from http://www19.ipdl.inpit.go.jp dated Jun. 22, 2011.
Abstract of JP 2006-007661 from http://www19.ipdl.inpit.go.jp dated Dec. 9, 2008.
Abstract of JP 2007-098626 from http://www19.ipdl.inpit.go.jp dated Jun. 22, 2011.
RU 2 155 674 C2—English abstract obtained from Espacenet (http://worldwide.espacenet.com) accessed on Feb. 22, 2012, 1 page.
JP49-081487A—English abstract obtained from Nakamura & Partners on Jun. 29, 2012, 1 page.
DE2740609A1—English machine translation obtained from Espacenet (http://worldwide.espacenet.com) on Aug. 7, 2012, 5 pages.
SU1369916A1—English abstract obtained from McElroy Translation on Aug. 20, 2012, 1 page.
SU1431960A1—English abstract obtained from McElroy Translation on Aug. 20, 2012, 1 page.
SU1705118A1—English abstract obtained from McElroy Translation on Aug. 20, 2012, 1 page.
JP2000-108222A—English machine translation obtained from Patent Abstracts of Japan (http://www19.ipdl.inpit.go.jp) on Jun. 22, 2012, 6 pages.
JP2002-240164A—English machine translation obtained from Google Translate (http://translate.google.com) on Aug. 7, 2012, 7 pages.
RU2225792C2—English abstract obtained from Espacenet (http://worldwide.espacenet.com) on Aug. 7, 2012, 2 pages.
EP1498249A1—English abstract obtained from Espacenet (http://worldwide.espacenet.com) on Aug. 7, 2012, 2 pages.

(56) References Cited

OTHER PUBLICATIONS

JP2006-10856A—English machine translation obtained from Google Translate (http://translate.google.com) on Aug. 7, 2012, 18 pages.
JP2007-283998A—English machine translation obtained from Google Translate (http://translate.google.com) on Aug. 8, 2012, 13 pages.
JP54000080A—English abstract obtained from Espacenet (http://worldwide.espacenet.com) on Oct. 10, 2012, 1 page.
JP1314151A—English abstract obtained from Espacenet (http://worldwide_espacenet.com) on Oct. 10, 2012, 2 pages.
JP1314152A—English abstract obtained from Espacenet (http://worldwide.espacenet.com) on Oct. 10, 2012, 2 pages.
JP2001179849A—English abstract obtained from Espacenet (http://worldwide.espacenet.com) on Oct. 10, 2012, 2 pages.
JP2006110856A—English abstract obtained from Espacenet (http://worldwide.espacenet.com) on Oct. 10, 2012, 2 pages.
JP2007185886A—English abstract obtained from Espacenet (http://worldwide.espacenet.com) on Oct. 10, 2012, 2 pages.
JP2008260296A—English abstract obtained from Espacenet (http://worldwide.espacenet.com) on Oct. 10, 2012, 2 pages.

* cited by examiner

METHOD AND APPARATUS FOR FORMING A TIRE COMPONENT UPON AN AXIALLY TAPERED SURFACE This application is a National Stage application of International Application No. PCT/US2008/085732, filed Dec. 5, 2008, to which this application claims priority and the benefit of, the disclosure being hereby incorporated by reference.

BACKGROUND OF THE INVENTION

1. Field of the Invention

This invention relates generally to methods and apparatus for forming an article on an axially (i.e., laterally) tapered (i.e., radially varying) surface of revolution. In particular embodiments, this invention relates to methods and apparatus for generating strips of material and applying the same to an axially tapered surface of revolution, such as, for example, a frusto-conical or conical surface, or a portion of a torus (i.e., the surface of a toroid), to form a tire component, where such surface varies radially while extending in an axial direction to form an "axially tapered surface". The taper (i.e., radial variation) may be linear or non-linear. For example, an axially tapered building surface forms a sidewall portion of a tire or tire carcass, which, more specifically may be zone-shaped or frusto-conically-shaped.

2. Description of the Related Art

Various processes exist for forming bands comprising tire articles (or components), such as, for example, tire tread bands. Such processes include a winding process in which strips of material are wound about a substantially cylindrical building surface, such as a tire carcass, to build a cylindrical band or wound article. For example, a tread band may be wound about the cylindrical surface of a tire carcass. Substantially cylindrical is defined to mean that the axially extending outer surface of the cylinder extends axially in a linear or slightly arced path. However, such processes are unable to properly and accurately apply strips of material to a non-cylindrical or axially tapered surface, such as, for example, a frusto-conical or zone-shaped surface, which may form a tire sidewall portion. One issue is that the surface velocity of the axially tapered surface varies across its surface width, whereas the surface velocity of a cylindrical surface is substantially constant across its width. Accordingly, difficulty arises when transferring materials from a cylindrical surface to a non-cylindrical surface, especially when transferring at a higher rate or speed. Further, the material will stretch and even move when being transferred between cylindrical and non-cylindrical surfaces due to the change in surface velocities. Therefore, it may be desirous to provide a process that better facilitates application of strips to an axially tapered surface, such as, for example, the application of sidewall material to a sidewall portion of a tire carcass.

In the prior art, one or more strips may be assembled along the substantially cylindrical surface to form the desired profile during the winding process. Application of each strip includes initially placing the strip manually upon the drum, winding the strip about the drum as desired, and subsequently cutting the strip from a supply source when a sufficient quantity of strip has been applied. A subsequent strip may be applied, which generally requires manual attachment thereof to the drum. Application of a second strip may also require a substitution of supply sources. The overall process provides a discontinuous, inefficient process, wherein interruptions arise when building a tire component band with subsequent strips. Therefore, it may be desired to provide a continuous process, where subsequent strips may be formed and applied automatically, without unnecessary interruption or delay.

SUMMARY OF THE INVENTION

The present invention includes methods and apparatus for forming an article about an axially tapered surface (of revolution), such as, for example, a sidewall portion of a tire or tire carcass. Accordingly, the present invention includes methods and apparatus for forming a tire component upon an axially tapered building surface. In particular embodiments, such methods include the step of providing a mechanical system, the system including a plurality of cutting members and an application surface for transferring material to the axially tapered building surface, the axially tapered surface comprising a surface of revolution that varies radially along a rotational axis of the surface. Particular embodiments may also include the steps of translating a sheet of material along a translation path through the mechanical system, and cutting a strip of material from the sheet with one or more of the plurality of cutting members during the step of translating. Particular embodiments may further include the step of mechanically transferring the strip of material from the application surface to the axially tapered building surface, the axially tapered building surface rotating about an axis of rotation during the step of translating. Other steps include mechanically translating the sheet about a closed-loop path, the path extending from a sheet generator and returning to the sheet generator for use as input material.

Particular embodiments of the present invention include mechanical systems for forming a tire component about an axially tapered building surface. Particular embodiments of such systems include a cutting assembly, the cutting assembly including a plurality of cutting members for cutting a strip of material from the sheet as the sheet translates through the system. Particular embodiments of such systems may further include an application surface for transferring a strip of rubber material to the building surface as the sheet translates through the system, the axially tapered building surface comprising a surface of revolution that varies radially along a rotational axis of the surface.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
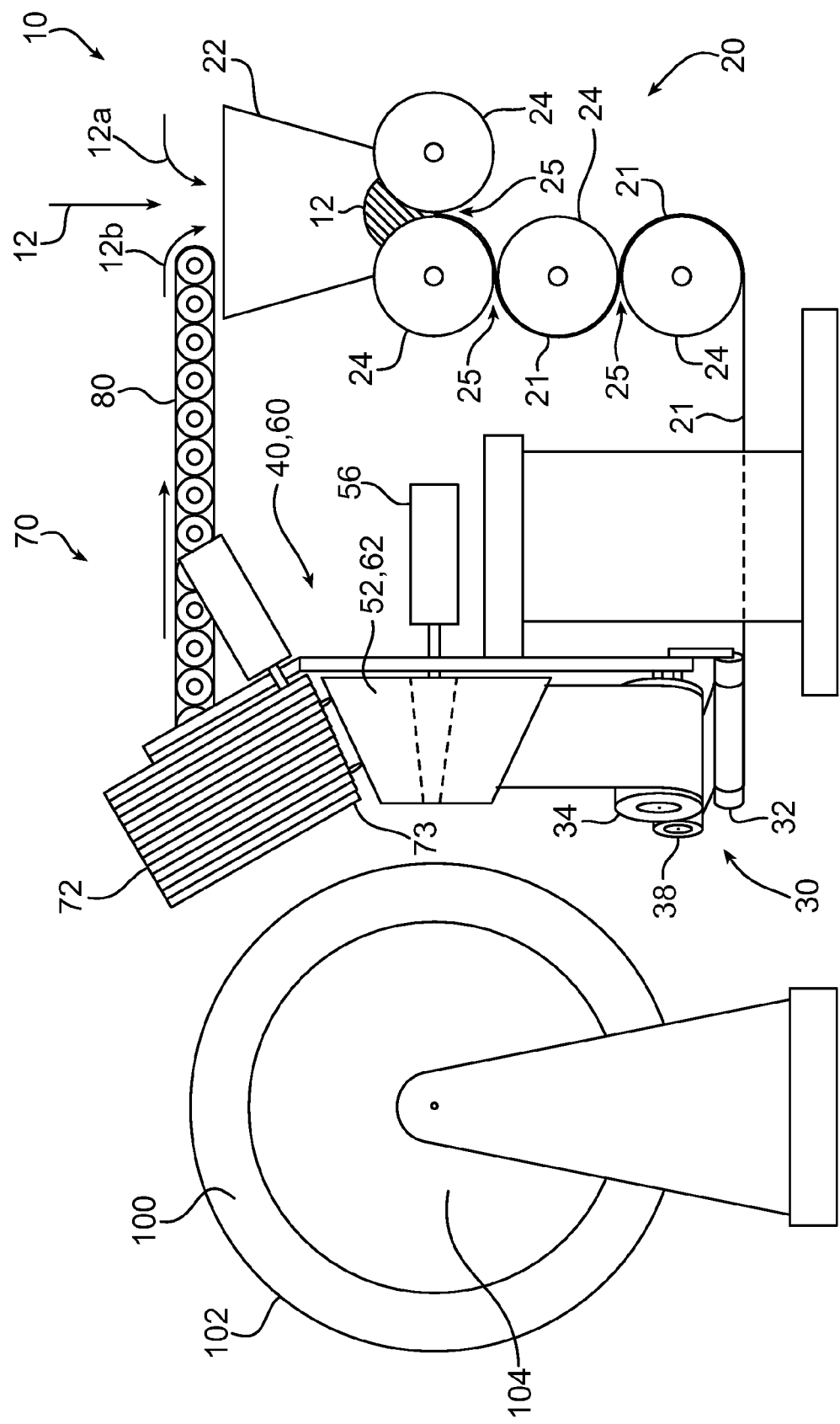
FIG. 1 is a side view of a system for forming a tire component about an axially tapered surface along a tire carcass, the system including a sheet generator, a roller assembly, cutting assembly, strip applicator assembly, and recovery assembly, to an embodiment of the invention.

Particular embodiments of the present invention provide methods and apparatus (i.e., machines or systems), for circumferentially applying material about an axially tapered (i.e., radially variable) surface of revolution to form an article, such as, for example, a tire component. An axially tapered surface varies radially while extending in an axial direction. In other words, an axially tapered surface is a surface that varies radially along the surface's rotational axis, and may comprise, for example, any conical or frusto-conical surface, a torus (i.e., the surface of a toroid), spheroid, circular paraboloid, hyperboloid, or zone (in the context used herein, zone is a geometrical term that references a portion of a sphere located between two parallel planes, which, as a result, has a non-linear axial taper—whereas in contrast, a frusto-conical surface has a linear axial taper). It follows that the axial taper (i.e., radial variation) of a axially tapered surface may be linear or non-linear. The axially tapered surface of revolution upon which the article is applied is referred to as the axially tapered building surface.

With generally reference to FIGS. 1-3 and 11, a system 10 is generally shown for practicing particular embodiments of the methods disclosed herein. System 10 is but one example of a system that may be used to practice any embodiment or variation of the methods described herein. As shown, system 10 generally provides a sheet 21 of materiel that translates through system 10 to ultimately form article 14 upon axially tapered building surface 100. Sheet 21 is cut into strips 41 by cutting members 42 and subsequently applied to building surface 100 by strip application surface 64. Strips 41 are applied to building surface 100 to form an article 14, which generally forms a non-cylindrical band or ring having an axially tapered surface. Article 14 may comprise one or more wrapped layers of material formed from one or more strips 41.

Figure 2:
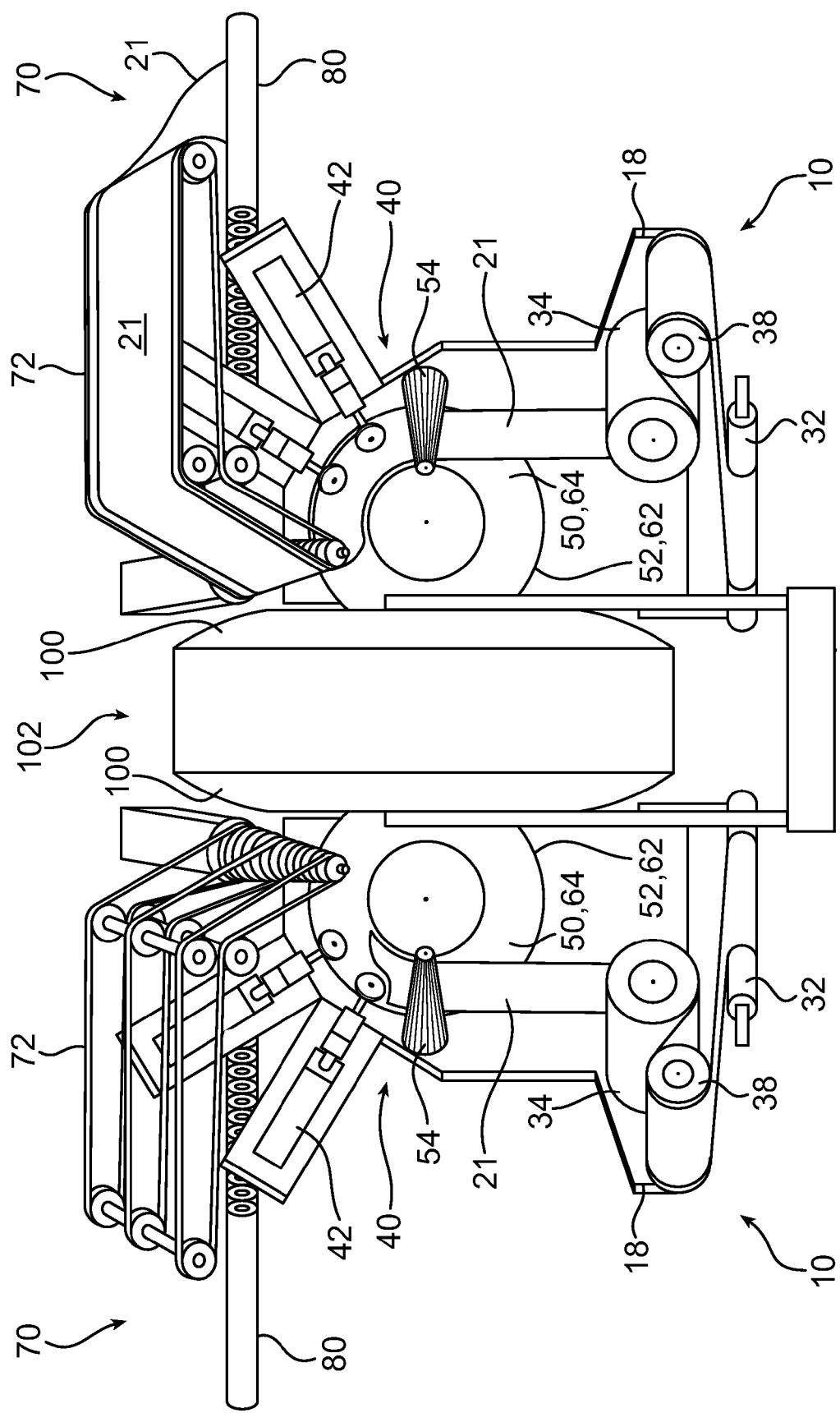
FIG. 2 is a front view of the tire component-forming system shown in FIG. 1, wherein several belts of one recovery assembly are removed to better show the underlying components of the recovery assembly, and a sheet is shown translating along a second recovery assembly, according to an embodiment of the invention
Figure 3:
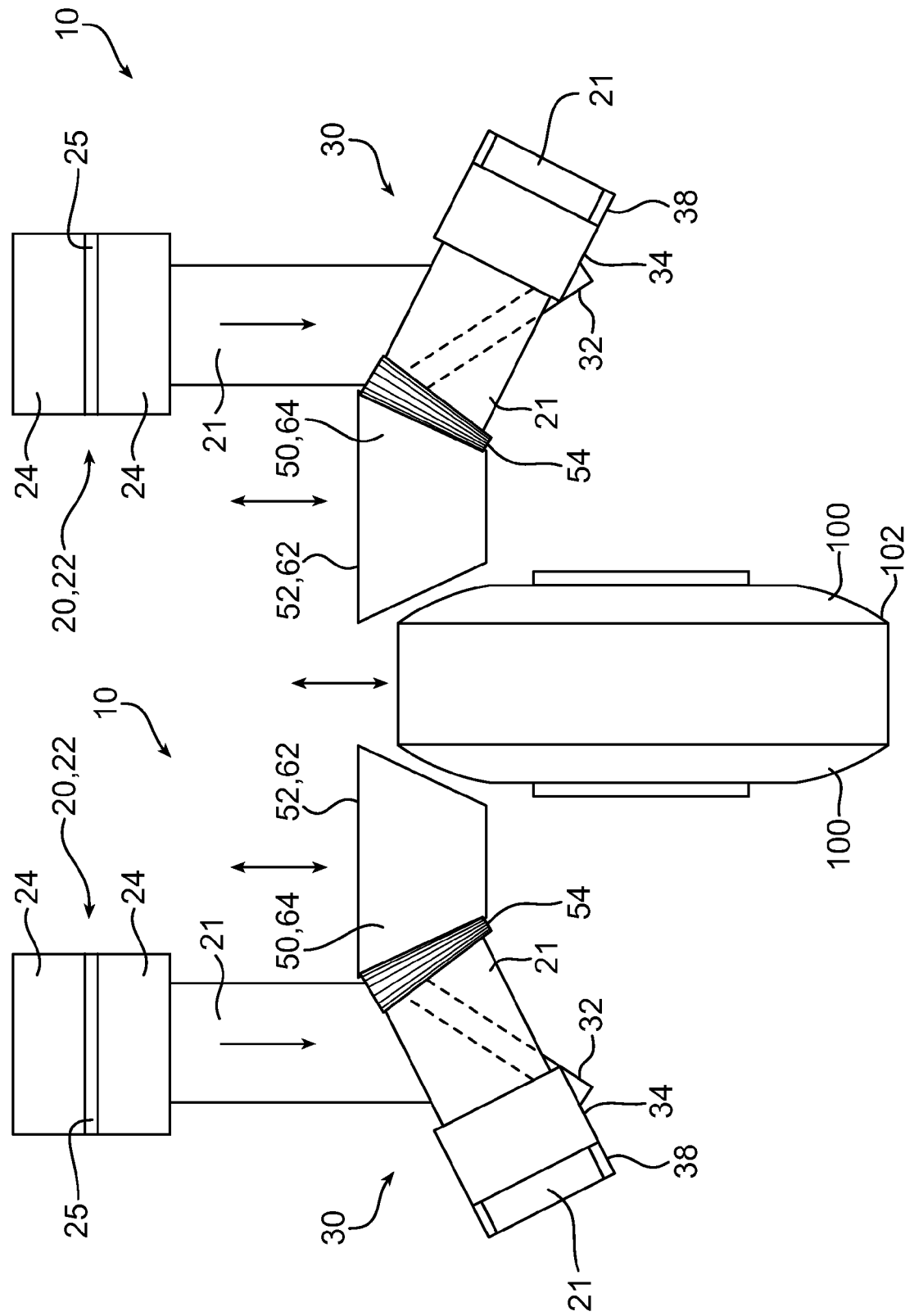
FIG. 3 is a partial top view of the tire component-forming system shown in FIG. 1, which shows the sheet generator and roller assembly in association with the tire carcass, according to an embodiment of the invention.

Axially tapered building surface 100 may comprise any axially tapered surface of revolution, as defined above. With reference to FIGS. 1-3, tapered building surface 100 is a tire sidewall portion, which is generally a zone-shaped surface. When transferring material having a width, such as a strip 41, to any axially tapered surface, the transferred material may tear, shear, distort, stretch, buckle, twist, or otherwise become misapplied to the axially tapered surface. This is because the surface speed along the axially tapered surface varies axially (laterally) when the surface as a whole rotates at a constant rate about its rotational axis. This variable surface speed results because the radial distance between surface (i.e., building surface 100) and its rotational axis varies axially (i.e., along the lateral width of the surface). Accordingly, if material is not supplied at rates or speeds similar to the axially tapered surface, a differential in speed between the material and the axially tapered surface may detrimentally affect the physical dimensions and condition of strip 41, and its application to axially tapered building surface 100.

In an effort to reduce or eliminate the detrimental affects that may be associated with application strip 41 to axially tapered building surface 100, an axially tapered application surface 64 transfers strip 41 to surface 100, such as is shown in FIGS. 1-3 and 11. Application surface 64 is an axially tapered surface as defined above, with respect to building surface 100. As shown, an application surface 64 is associated with applicator drum 62 for transferring strips 41 to building surface 100 at surface speeds similar to those of building surface 100.

The present invention will now be discussed in more detail with reference to system 10. With reference to FIGS. 1-2, an embodiment of a system 10 for forming an article 14 on an axially tapered building surface 100 is shown. In the embodiment shown, system 10 also includes a sheet generator 20, a cutting assembly 40, a strip applicator assembly 60, a recovery assembly 70, and a programmable logic controller 90 (see FIG. 13). System 10 also includes a roller (transfer or tensioning) assembly 30 for controlling the translation and/or tensioning of sheet 21 between generator 20 and cutting assembly 40. In the embodiment of FIG. 1, building surface 100 comprises the sidewall portion of a tire carcass 102, which is mounted on a rotatable drum 104. Also shown in FIG. 1 are two systems 10 operating concurrently, for example, to form opposing sidewall components along tire 102. In any application, one or more systems 10 may be used to apply strips 41 at different locations along one or more target objects, each of the strips 41 being formed of the same or different materials.

System 10 may include a means of forming a sheet of material 21. With reference to FIG. 1, the means of forming a sheet 21 is referred to as a sheet generator 20. Sheet generator 20 transforms input material 12 into a sheet 21 for forming article 14. Sheet 21 may be formed from any material, such as, for example, any polymer, plastic, or elastomer. Multiple materials or composites may also be used. An inlet 22 is provided for accepting input material 12, which may comprise new material 12a and/or previously used (recycled) material 12b. As shown, previously used material is returned automatically by recovery assembly 70, while in other applications, recycled material may be returned manually or by other processes.

In the embodiment shown in FIG. 1, generator 20 comprises a calender, which may utilize any desired quantity of calender rolls 24 to transform input material 12 into a sheet 21. For example, the generator 20 shown utilizes four calender rolls 24 to form three nips 25. Sheet 21 may be sized according to any desired width and thickness, by any known means in the art. For example, the width may be controlled by side cutters, and the thickness controlled by varying the size of the nip, which is the gap formed between adjacent rolls through which material passes. If additional manipulation is not desired, the nip of each subsequent pair of rolls, if existing, may be widened to avoid any additional processing. The cross-sectional dimensions of sheet 21 may also be adjusted and/or controlled by regulating the translational speed and/or tension of sheet 21 as it travels through generator 20 and/or system 10. In other applications, generator 20 may comprise an extruder, or any other known means of forming a sheet 21, which may be used in lieu of, or in combination with, a calendar. Extruders heat and force input material 12 through a die (i.e., a port) having any desired cross-sectional shape, such as by way of a screw. In still other applications, sheets 21 may be pre-formed or otherwise supplied to system 10 without use of a sheet generator 20.

As mentioned above, sheet 21 may be sized according to any desired width and thickness. Still, it is desirous for sheet 21 to maintain a minimum thickness to prevent any tearing of sheet 21 while navigating through system 10. Of course, a minimum thickness may vary based upon the properties of the material forming sheet 21, and/or upon the operating conditions of sheet 21. For typical passenger tire applications, the thickness of sheet 21 is between 0.5 and 1.5 millimeters (mm). To further improve resistance to tearing, sheet 21 may include particular areas of increased thickness, such as, for example, areas along the lateral sides of sheet 21. Further, generator 20 may provide an intermittent increase in the cross-sectional thickness of sheet 21 to prevent any tearing of sheet 21 when system 10 resumes from a delay in sheet generation.

With reference to FIGS. 1-4, upon exiting sheet generator 20, sheet 21 travels lengthwise along a translation path through roller assembly 30. Roller assembly 30 directs sheet 21 toward cutting system 40 and/or applicator assembly 60 in any desired path, and may also control the tension and dimensions of sheet 21. Roller assembly 30 may comprise any type and quantity of rollers arranged (oriented and positioned) as desired to achieve its intended purpose. As shown in the FIGURES, a transition roller 32 is provided to alter the translational path of sheet 21. Positioning transitional roller 32 at an angle relative to the upstream translational direction of sheet 21 alters the translational direction of sheet 21 as it rotates about roller 32. Subsequent to transitional roller 32, rollers 34, 38 are positioned to direct sheet 21 toward cutting assembly 40 and/or applicator assembly 60. Rollers 34, 38 arranged such that sheet 21 translates along an alternating path through such rollers to cooperatively constrain sheet 21 along its translation path. Accordingly, sheet 21 is able to be stretched (tensed) between roller 34 and cutting drum 52. In the system shown, rollers 32, 34, 38 are cylindrically shaped, and sheet 21 translates perpendicularly relative to the rotational axis of each such roller. In other arrangements, other types, quantities, and/or combinations of rollers may be used as desired. For example, any roller 32, 34, 38 may be non-cylindrical or axially tapered, or may not be used, each of which may further alter the translational path and/or tensioning of sheet 21. Still further, in other arrangements, system 10 may not include a roller assembly 30, whereby generator 20 directly supplies sheet 21 to cutting assembly 40 and/or applicator assembly 60.

Figure 4:
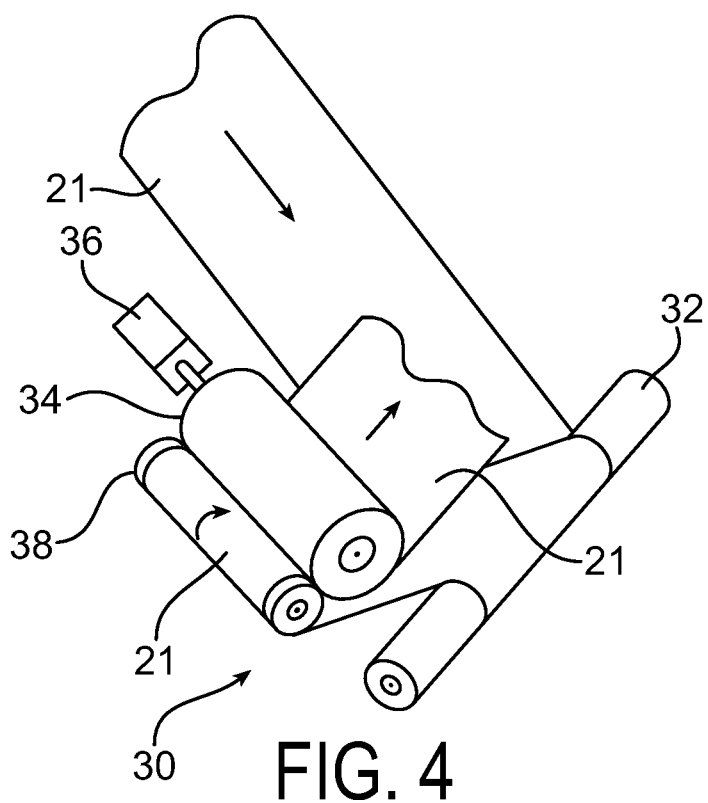
FIG. 4 is a perspective view of the tensioning assembly of the system shown in FIG. 1, according to an embodiment of the invention. The arrows shown represent the translational direction of sheet 21.

Any roller in roller assembly 30 may be driven (or undriven) to assist in the translation, and/or tensioning, of sheet 21. As shown in FIG. 4, roller 34 is driven by motor 36, which in turn drives sheet 21 through assembly 30. In particular instances, the rotational speed of motor 36 is synchronized with the speed of generator 20, so not to stretch or compress sheet 21. In other instances, one or more driven rollers may be used to generate tension along sheet 21 by creating a speed differential along sheet 21. Sheet 21 may also be tensioned by creating a speed differential between roller assembly 30 and generator 20, cutting assembly drum 52, and/or applicator drum 62.

With general reference to FIGS. 1-2, and more specifically to FIGS. 5-7 and 10, system 10 includes a cutting assembly 40. Cutting assembly 40 forms strips 41 from sheet 21 for subsequent application to building surface 100 and formation of article 14. Specifically, cutting assembly 40 utilizes a plurality of cutting members 42 to form strips 41 from sheet 21. Each cutting member 42 includes a cutting edge 43 to cut or otherwise lacerate sheet 21. Cutting members 42 generally are spaced along a length of sheet 21, and a width of cutting surface 50 of cutting drum 52. As shown, cutting members 42 are freely (independently undriven) rotating knives or discs, which operate similarly to idler wheels and with translating sheet 21 and/or cutting surface 52. Still, in other applications, rotating knives may be independently driven by any known means, such as a motor. Although rotating knives are shown, cutting members 42 may comprise any other apparatus or means for lacerating sheet 21 or otherwise forming strips 41 known to one of ordinary skill in the art, such as, for example, any other non-rotating knives, blades, or edges.

Figure 5:
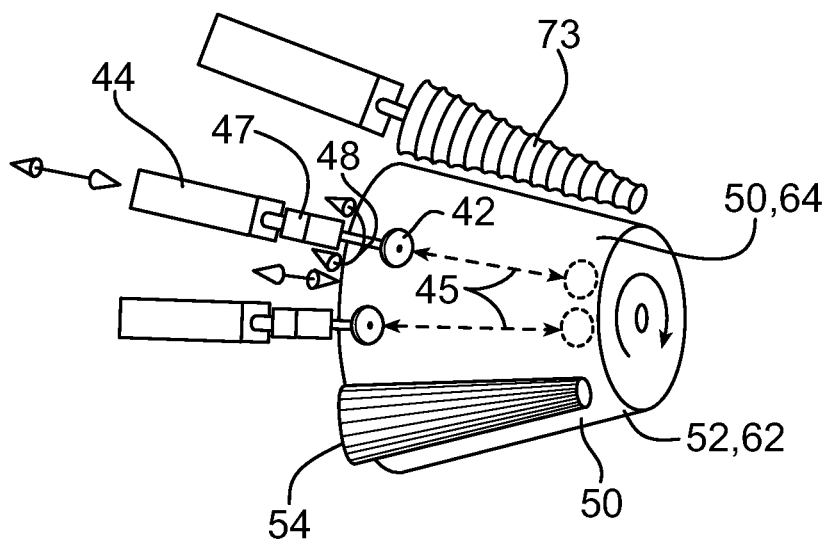
FIG. 5 is a front or end perspective view of the strip cutting and applicator assemblies of the system shown in FIG. 1, according to an embodiment of the invention.

With reference to FIG. 5, cutting members 42 translate laterally along any full or partial width of sheet 21 or cutting surface 50, or axially relative to cutting drum 52. Translation is achieved by translation members 44, each of which may comprise any translation means known to one of ordinary skill in the art, such as, for example, a linear actuator, a servo motor, or a pneumatic or hydraulic cylinder. Translation members 44 may also operate along a track or rail. Translation may be linear or non-linear. In the application shown, translation members 44 each translate a cutting member 42 along a translational axis 45. Each cutting member 42 may also be capable of extending up and down relative to sheet 21 by way of an extension member 47, for the purpose of engaging and disengaging sheet 21. Extension member 47 may comprise any means of extending, such as, for example, a servo, solenoid, or any pneumatic or hydraulic cylinder. Finally, each cutting member 42 may also be capable of pivoting or rotating along an axis extending through sheet 21, as generally represented by arrows 48, for the purpose of better facilitating an angled or transverse cut along a width of sheet 21. Such rotation may be achieved by any means known to one of ordinary skill in the art, which may comprise, for example, a linear actuator or an electromagnetic solenoid. Controller 90 (shown in FIG. 13) generally controls the operation and movement of cutting members 42, and any of the three motions. Controller 90 may cooperate with a single or multi-axis motion controller to synchronize and coordinate the operation and movement of the cutting members 42.

Figure 9:
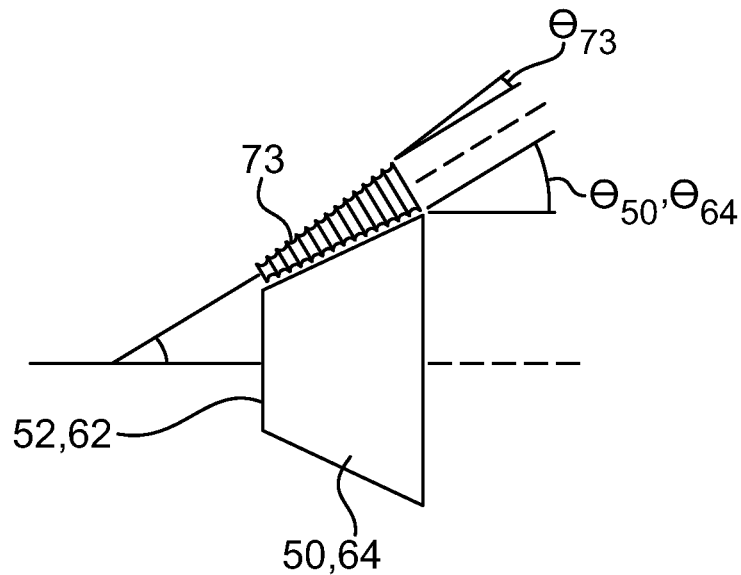
FIG. 9 is a side view of the applicator drum and the return roller of the system shown in FIG. 1, according to an embodiment of the invention.

With reference to FIGS. 1-3, 5-7, cutting surface 50 is an axially tapered surface (as described above in association with application surface 64) formed along cutting drum 52. With reference to FIG. 9, the axial taper of surface 50 is generally represented by angle $\theta_{50}$. Taper angle $\theta_{50}$ may comprise any desired angle. For example, in a particular application, taper angle $\theta_{50}$ is approximately 23 degrees. In other applications, it is contemplated that cutting surface 50 may be cylindrical or substantially flat or planar.

Figure 6:
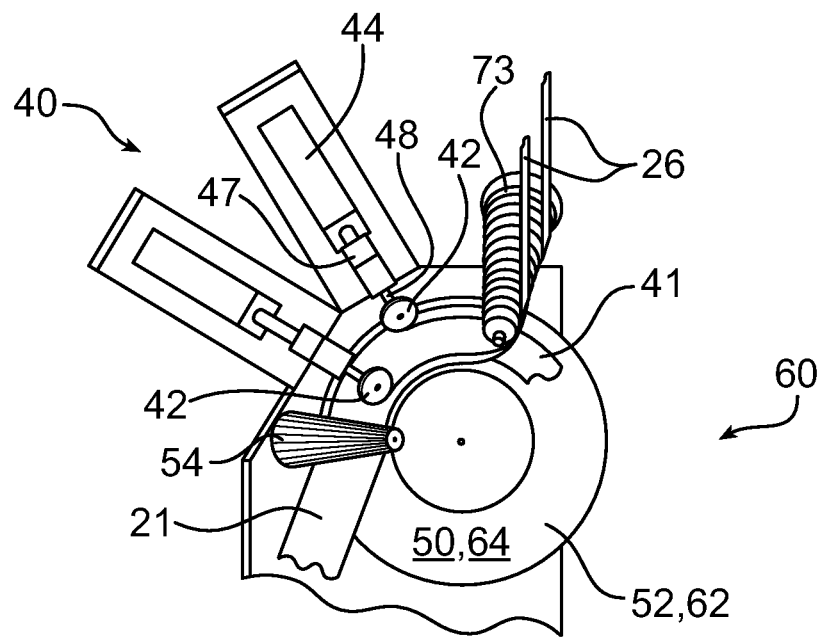
FIG. 6 is a front or end view of the strip cutting and applicator assemblies of the system shown in FIG. 1, according to an embodiment of the invention.
Figure 7:
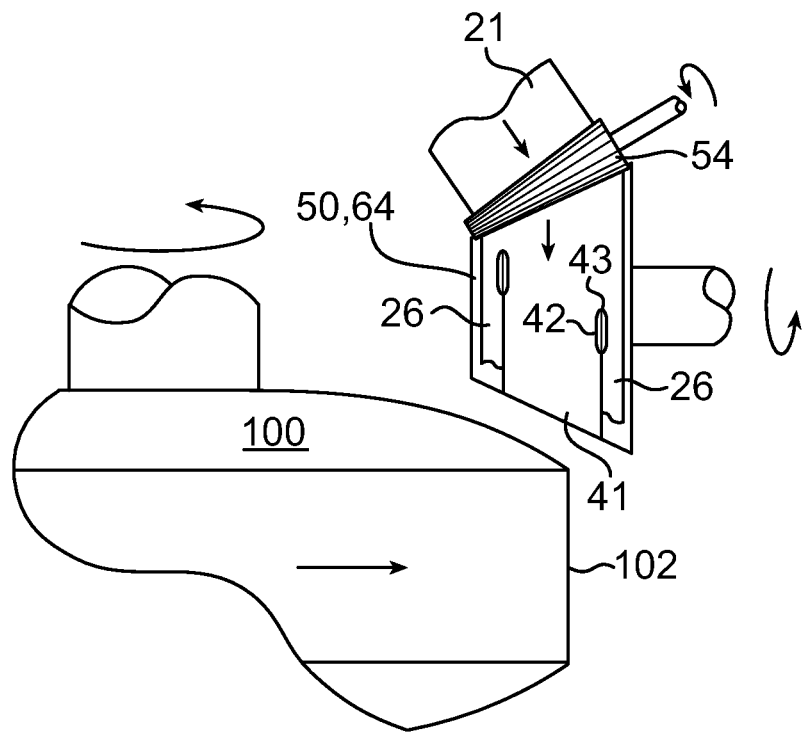
FIG. 7 is a top view of the strip cutting and applicator assemblies of the system shown in FIG. 1, shown in association with a tire carcass, according to an embodiment of the invention.
Figure 8:
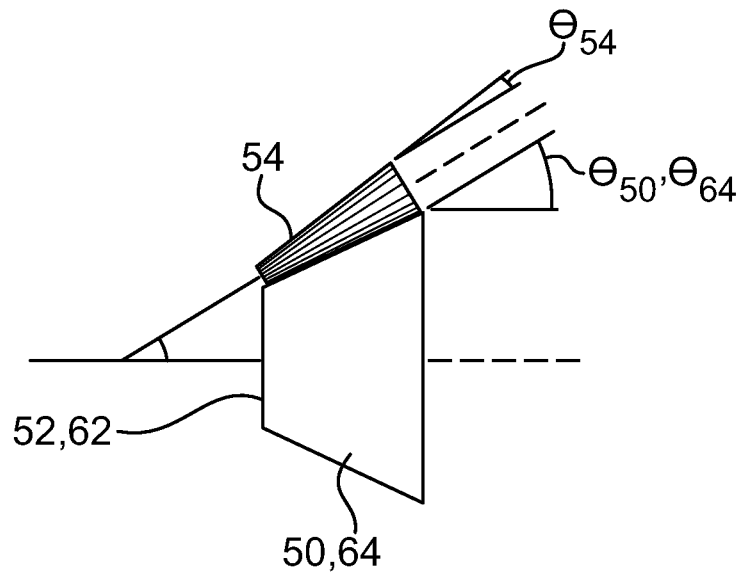
FIG. 8 is a top view of the nip and applicator drum of the strip cutting and applicator assemblies shown in FIG. 1, according to an embodiment of the invention.

It may be desirous to promote temporary adhesion between cutting surface 50 and sheet 21, such as to maintain accurate positioning of sheet 21 and strips 41. Proper adhesion is sufficient (i.e., great enough) to prevent removal of strips 41 by removal assembly 70, while also allowing (i.e., being small enough to allow) the removal and transfer of strips 41 to building surface 100. Improved adhesion may be achieved by providing a substantially smooth cutting surface 50, which may be coated with chrome and/or buffed or polished, for example. Adhesion may also be improved by controlling the temperature of cutting surface 50 (by heating or cooling), and/or by forcing (applying pressure to) sheet 21 against cutting surface 50, such as by roller 54. The controlled temperature and degree of pressure is dependent upon the material(s) forming sheet 21. As shown in FIGS. 5-7, the roller 54 is generally designed and oriented to operate in a gear relationship (at similar surface speeds) with cutting drum 52, and, in the arrangement shown, the outer surface of roller 54 is an axially tapered surface designed to operate in conjunction with the axially tapered surface of cutting drum 52. At least the outer surface of roller 54 may be formed of a compliant or flexible material, such as, for example, silicone, for the purpose of providing a desired, and more uniform, pressure along sheet 21. Of course, the adhesion is temporary as each strip 41 is ultimately removed and transferred for application to a building surface 100.

With reference to FIG. 1, a motor 56 may be provided to drive cutting drum 52, and therefore, drive sheet 21 into and through cutting assembly 40, and/or control the dimensions of sheet 21. Motor 56 may be controlled by controller 90 (shown in FIG. 13), for the purpose of coordinating the operation of cutting members 42 to cut strips 41 from a sheet 21 translating along cutting surface 50.

Figure 10:
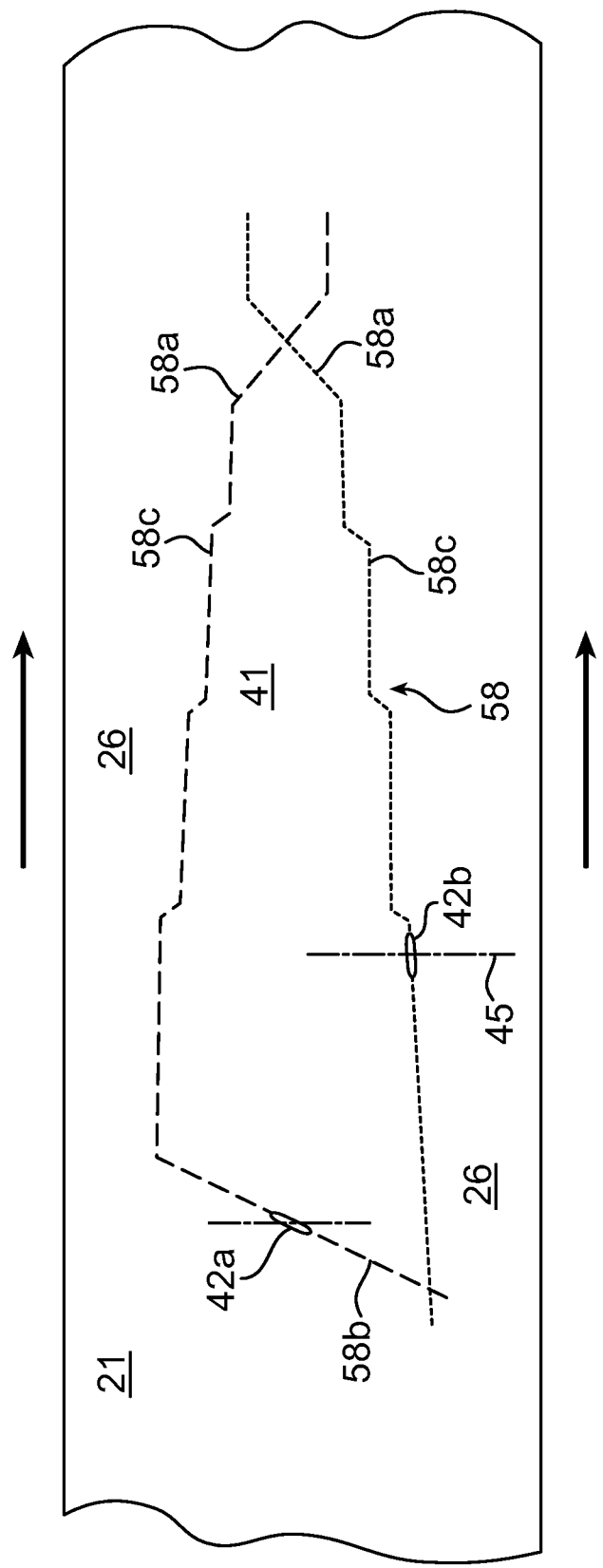
FIG. 10 is a top view of a sheet of material for translation through the system of FIG. 1, showing cutting paths formed into the sheet from which strips have been formed and removed, according to an embodiment of the invention. The rightward pointing arrows indicate the direction of travel of sheet 21.

With reference to FIG. 10, cutting members 42 form one or more strips 41 within a translating sheet 21. In the application shown, a pair of cutting members 42 cuts a set of intersecting paths 58 or perimeter to form a strip 41. In other applications, a plurality of cutting members 42 may cut two or more strips 41 at the same time along sheet 21. Path 58 circumscribes strip 41, and may comprise a leading edge 58a, a trailing edge 58b, and one or more side edges 58c. Leading edge 58a and trailing edge 58b, each of which form a beginning and end of strip 41, respectively, may also operate as a side edge 58c (or no leading or trailing edge may exist), such as when, for example, a side edge 58c tapers inwardly to intersect a trailing edge 58b or another side edge 58c, as is the case when forming a triangular or 4-sided diamond-shaped strip 41. Further, as shown in the FIGURES, when a pair of cutting members 42a, 42b operates cooperatively, the pair is placed in a staggered arrangement along a length of the sheet 21 to allow the corresponding cutting paths of 42a and 42b to intersect at the beginning and/or end of each strip 41, as shown by example in FIG. 10. One or more additional cutting members 42 may be used to cut certain portions of path 58, such as leading and/or trailing edges 58a, 58b, respectively. Cutting members 42 may form a strip 41 having any shape, including a constant width strip 41 or a variable width strip 41, such as is shown by example in FIG. 10. A variable width strip 41 may be stepped, as shown by example in FIG. 10, or may be linearly tapered or contoured. In a stepped arrangement, each length of strip 41 between steps (i.e., a step length) may substantially represent or extend about a circumference of the building surface 100.

In other applications, a strip 41 may be formed without cutting a perimeter about such strips, such as when a strip 41 is formed along a side of sheet 21. One or more cutting members 42 may also cut air-releasing slits during or after the formation of strips 41, to facilitate removal of trapped air from article 14.

As shown by example in FIG. 10, when making a lateral cut, each cutting member 42a, 42b may rotate its cutting edge 43 to a desired non-zero angle relative to the translational direction or centerline of sheet 21 (or to a non-perpendicular angle relative to translation axis 45), as shown in FIG. 10. In other instances, any cutting member 42 may not rotate when making lateral cuts. It is contemplated that leading and trailing edges 58a, 58b, respectively, may be formed by a single cutting member 42, such as is generally shown with regard to trailing edge 58b in FIG. 10, or by two or more members, as generally represented by leading edge 58a in FIG. 10. As shown in FIG. 10, a pair of cutting members 42a, 42b, may form all cuts necessary to form a strip 41. In other arrangements, other variations or means of forming strips 41 may exist.

With reference to FIGS. 1-2, subsequent to the formation of one or more strips 41, the remaining portion of sheet 21 is directed to recovery assembly 70 for reuse by generator 20. To maintain a continuous sheet 21 that automatically navigates through system 10, one or more continuous segments 26 remain in sheet 21 after removal of one or more strips 41 there from. Each continuous segment 26 remains attached to preceding and subsequent portions of sheet 21. As shown in FIG. 10, for example, a pair of segments 26 extends along the lateral sides of sheet 21. In other instances, segments 26 may be located at any location within sheet 21, including intermediately (internally) within sheet 21 (between the lateral sides of sheet 21). To maintain the integrity and continuity of sheet 21, the cross-sectional shape of each segment 26 is sufficiently sized to prevent any tearing of such segment 26. For example, when sheet 21 is between 0.5-1.5 mm thick, the combined width of all segments 26 (i.e., along a transverse plane perpendicular to the translation direction (i.e., the direction of travel) of sheet 21) is at least 20 mm. By further example, when sheet 21 is between 0.5-1.5 mm thick, the width of each such segment 26 is at least 5 mm wide. Of course, the size of a segment 26 may vary according to the material forming sheet 21 (as different sheet materials may have different tear properties). Segments 26, or a portion thereof, may also comprise an additional mass or thickness to further resist tearing.

With general reference to FIGS. 1-3, 5-8, and 11, system 10 also includes an applicator assembly 60 for applying one or more continuous strips 41 to a building surface 100 to form a component 14. Applicator assembly 60 includes application surface 64, which is associated with an applicator drum 62, for concurrently transferring one or more strips 41 to an axially tapered building surface 100. As discussed above, and shown in the FIGURES, application surface 64 is an axially tapered surface. With specific reference to FIGS. 8-9, application surface 64 of applicator drum 62 has a taper relative to its rotational axis generally represented by angle $\theta_{64}$. Taper angle $\theta_{64}$ may comprise any desired angle. For example, in a particular application, taper angle $\theta_{64}$ is approximately 23 degrees. In other arrangements, application surface 64 may comprise a cylindrical surface, which may require its rotational axis to be aligned in parallel with the axially tapered building surface 100. As shown in the FIGURES, in particular arrangements, applicator drum 62 and application surface 64 may operate as the cutting drum 52 and cutting surface 50, respectively, and visa versa.

As discussed above, axially tapered building surface 100 may comprise any desired surface, which may be associated with any object or building drum. For example, with reference to FIGS. 1-2, building surface 100 may initially comprise a sidewall portion of tire carcass 102, which is mounted upon a rotatable drum 104. In other examples, building surface 100 may form a portion of a building drum 104. Once a strip 41 has been applied to the building surface, the building surface for subsequent strips 41 may include at least a portion of the previously-applied strip 41.

Figure 11:
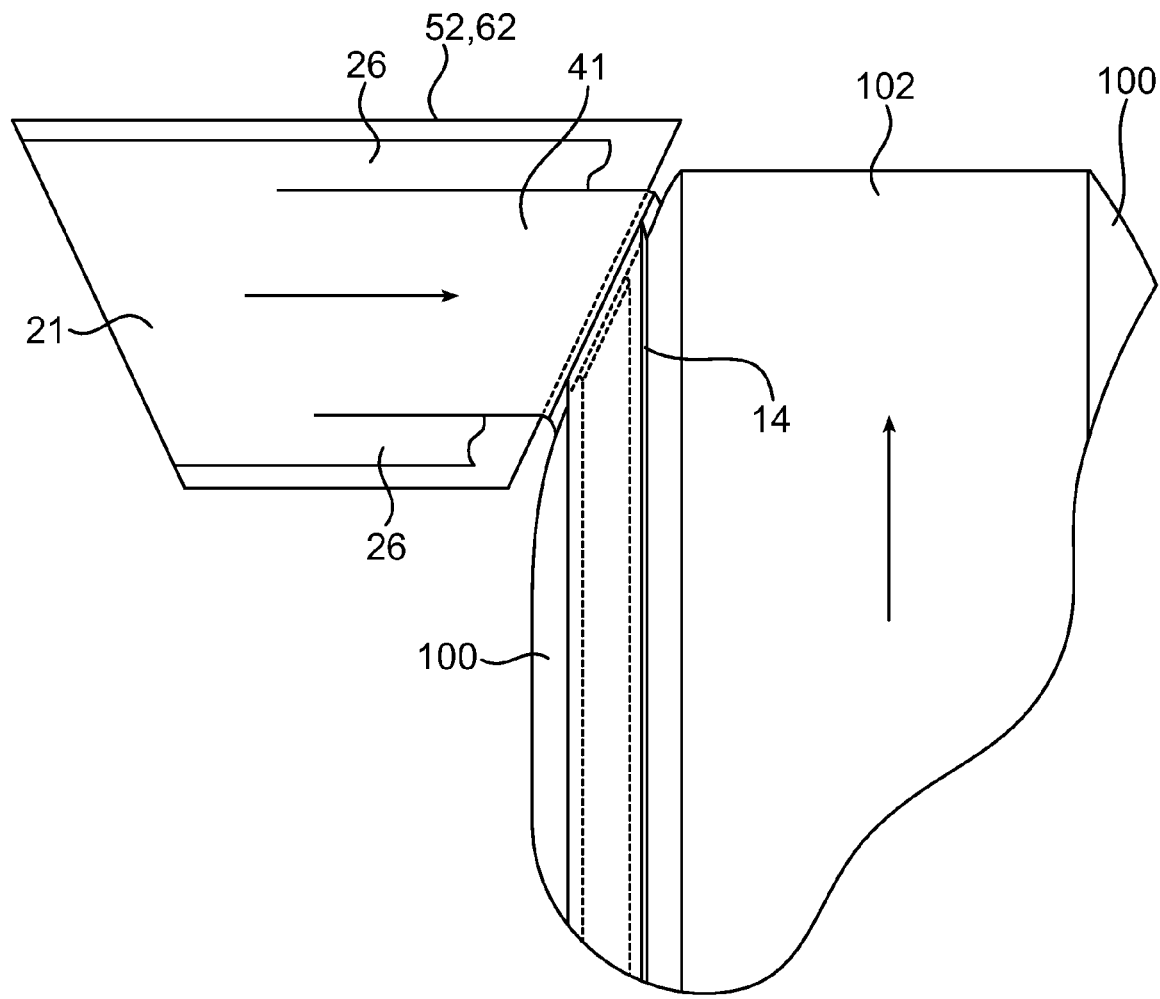
FIG. 11 is a top view of the applicator assembly applying a strip of material to an axially tapered surface (i.e., sidewall portion) of a tire carcass, according to an embodiment of the invention. The arrows along sheet 21 represent the translation direction of sheet 21, while the arrow shown along tire 102 represents the tire's rotational direction.

In operation, according to one embodiment, application surface 64 (as well as applicator drum 62) translates from an initial (home) position to a transfer or engagement position relative building surface 100, which is generally shown by example in FIG. 11. When in the engagement position, application surface 64 places strip 41 in contact with the building surface 100. Application surface 64 may remain in the engagement position, and retract or back out as the diameter of component 14 increases with multiple revolutions or layers of strip 41. In other applications, application surface 64 initially places strip 41 into contact with building surface 100, and subsequently retracts to an application position, whereby any strip being applied is placed into tension or stretched to forcefully apply such strip to building surface 100.

When the outer diameter of article 14 increases with multiple revolutions or layers of strip 41, the rotational velocity of the building surface 100 (the outer surface of component 14) increases. Accordingly, the rotational speed of building surface 100 (or building drum 104) may be decreased and/or the speed of application surface 64 (or building drum 62) may be increased to compensate for the increasing diameter of component 14. Once article 14 is complete, application surface 64 may translate and return to a desired position, such as the home position, to provide adequate clearance to facilitate subsequent handling and transport of tire 102 and/or article 14 from system 10. drum 104 It is contemplated that in lieu of, or in addition to, application surface 64 translating during the application process, building surface 100 may translate to achieve a relational translation between application surface 64 and building surface 50.

To achieve proper transfer and application of any strip 41, strip 41 may be applied with a desired pressure to promote proper adhesion between strip 41 and building surface 100. Sufficient pressure may be achieved by altering the relative position between application surface 64 and building surface 100. Additionally, a roller (not shown) may be used to apply pressure to the strip 41 after initial application while being applied to the building surface. Applying strip with pressure may also promote cohesion in the cured product by reducing any air trapped within article 14. When applying too much pressure strips 41 may bridge within article 14 to form pockets of trapped air within article 14. In a further effort to reduce trapped air, one of the application surface 64 and building surface 100 may extend in an axially tapered path that is arcuate or non-linear, which may provide an centrally-located point of initial contact between the opposing surfaces that will expand laterally or outwardly with increasing contact or pressure.

To further facilitate the removal of trapped air within article 14, a surface of strip 41 (or sheet 21) may be texturized with surface features to allow air to pass from an interior portion of component 14 to an outer edge thereof. Such surface features may comprise, for example, grooves, ribs, or other raised or sunken features capable of directing air to the exterior of article 14. Surface features may be formed along strip 41, or along sheet 21 prior to strip formation. Surface features may be formed by a texturized roller, such as roller 54, or any other roller in system 10, including a calender roll 24. Any texturized roller includes texture-forming features, which may extend linearly an axial direction along the surface of roller 54, shown generally by example in FIG. 9, or may extend at an other angle relative to the rotational axis of roller 54. The texture-forming features may be positive (extending outwardly from the roller surface) or negative (extending into the roller surface). Alternatively, the texture forming features may be applied during other steps of the process, such as, for example, at the end of, or during, sheet generation by sheet generator 20. Strips 41 may also include slits or apertures to provide another means of releasing trapped air.

To promote adhesion between each cutting and application surfaces 50, 64 and sheet 21 and/or any strip 41, applicator drum 62 may be temperature controlled (i.e., heated or cooled). In particular instances, applicator drum 62 is maintained at a temperature at least 10 degrees Celsius lower than the temperature of sheet 21 and/or any strips 41. In other embodiments, applicator drum 62 is maintained at approximately 70 degrees Celsius. Still, other temperatures and temperature differentials may be maintained depending upon the physical dimensions and the material properties of sheet 21. Further, as discussed above, improved adhesion may be provided when surface 64 is a textured (rough) or smooth surface. A smooth surface may comprise a chromed or hot chromed surface. Further, the temperature controls and conditions, as well as the surface conditions and treatments discussed in association with applicator drum 62 above may also be utilized by cutting drum 52 to improve adhesion between application surface 50 and sheet 21.

Figure 12:
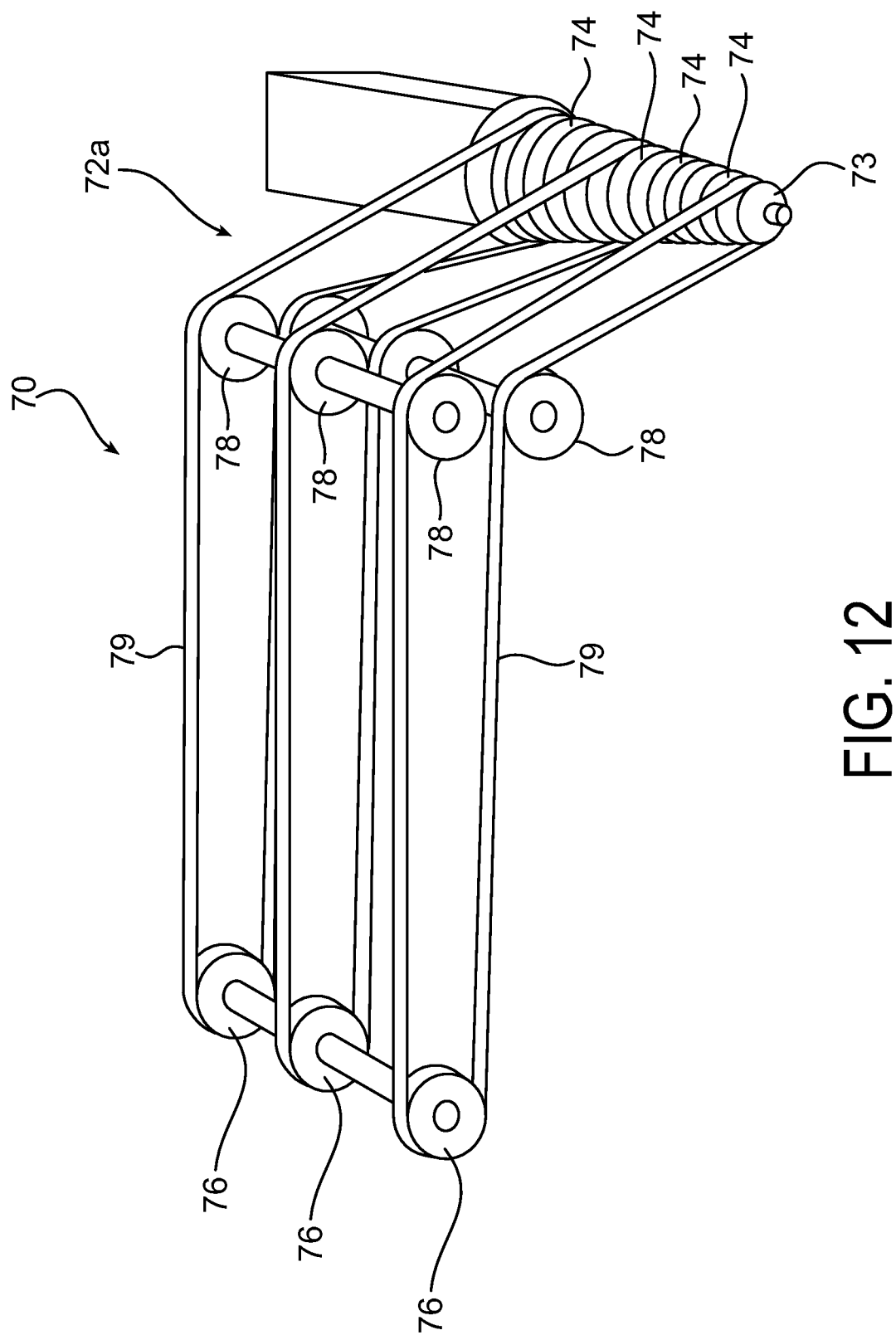
FIG. 12 is a partial top perspective view of a return assembly of the system shown in FIG. 1, wherein several belts of the recovery assembly are removed to better show the underlying components of the recovery assembly, according to an embodiment of the invention.

With reference to FIGS. 1-2 and 12, recovery assembly 70 receives sheet 21 after translating through cutting assembly 40 and/or applicator assembly 60, and translates the recovered sheet 21 back to generator 20 for reuse as input material, such as for continuous formation of sheet 21. Recovery assembly 70 is able to recycle 100% of the scrap (i.e., unused or remaining portions of sheet 21) generated after cutting and removing any strips 41 from sheet 21. By returning sheet 21 to generator 20, sheet 21 travels along a closed-loop translation path within system 10. The continuous, closed-loop path allows sheet 21 to start, stop, and restart as desired automatically, without manual intervention. Recovery assembly 70 may process a sheet 21, whether or not such sheet 21 was cut by cutting assembly 40.

Recovery assembly 70 generally comprises one or more conveyors to translate sheet 21 to generator 20. In the arrangement shown in FIGS. 1-2 and 12, recovery assembly 70 includes a first conveyor 72 and a second conveyor 80. When receiving sheet 21 from an axially tapered surface, such as from cutting surface 50 or application surface 64, first conveyor 72 is a variable surface speed conveyor, meaning that the translational (i.e., surface) speed of the conveyor varies laterally (i.e., axially) across its width. Because portions of sheet 21 exit the axially tapered surface at different speeds or rates, a variable surface speed conveyor is capable of receiving and translating sheet 21 at variable rates. Accordingly, to reduce any tearing or backup (i.e., buildup) of sheet 21 as enters recovery assembly 70, the surface of first conveyor 72 may translate at the same or similar speed of sheet 21 as sheet 21 exits any cutting and/or application assembly 40, 60.

With specific reference to FIG. 12, in a particular embodiment, variable surface speed first conveyor 72 includes an axially tapered roller 73, which may be, for example, conical or frusto-conical in shape. As shown in FIG. 9, the taper of roller 73 is represented by angle $\theta_{73}$. Taper angle $\theta_{73}$ may comprise any desired angle. For example, in a particular application, taper angle $\theta_{73}$ is approximately 5.4 degrees. In particular embodiments, a plurality of grooves 74 are provided along the length of roller 73 for the purpose of accepting belts 79. Belts 79 are arranged within groves 74 along the length of first conveyor 72 for the purpose of translating at different rates. Roller 73 is motorized to drive belts 79, which may comprise any belt known in the art, which may be, for example, V-belts, flat belts, rounded belts, and notched belts. Belts 79 generally extend between conveyor roller 73 and an arrangement of individual pulleys 76 extending across a width of first conveyor 72. Spring-blocks or other adjustment means may be provided for each pulley 76, so that each pulley 76 may adapt and adjust to changing conditions and loads, as well as to increase or decrease the tension along corresponding belts 79. One or more arrangements of rotating members 78 may extend across a width of first conveyor 72 between conveyor roller 73 and the arrangement of pulleys 76 to facilitate any desired change in the translation path of belts 79. It is contemplated that rotating members 78 may comprise, for example, a plurality of independent pulleys or a tapered roller similar to roller 73. In other arrangements, it is contemplated that roller 73 may be non-tapered, or cylindrical. In other embodiments, variable surface speed conveyor 72 may comprise any other conveyor design or translating means having a laterally or axially variable surface speed, or otherwise being capable of translating sheet 21 at a variable speed.

With reference to FIG. 1, second conveyor 80 is positioned below a distal end of first conveyor 72 to accept sheet 21 as it departs first conveyor 72. Second conveyor 80 transfers recovered sheet 21 for re-introduction into sheet generator 20 as input 12b. Second conveyor 80 may comprise any known conveyor. For example, second conveyor 80 may comprise a plurality of non-tapered or cylindrical rollers 82, with one or more being motorized to translate recovered sheet 21. Such exemplary conveyor may (or may not) include one or more conveyor belts 84 operating about the plurality of rollers 82. By further example, second conveyor 80 may comprise a variable surface speed conveyor similar to first conveyor 72. In lieu of the arrangement shown in the embodiments of the FIGURES, it is contemplated that a single conveyor may be used within recovery assembly 70, or any plurality of conveyors used as desired to return sheet 21 to generator 20.

Generator 20 may be capable of producing sheet 21 at various speeds, ranging from zero (0) meters per minute (m/min), to 50 m/min and above. This allows system 10 to rapidly produce sheet 21 during band formation, and to slow or temporarily halt sheet generation when desired. It is commonly known that over-processing and reheating of elastomeric material negatively affects fluidity, scorch, and other material properties. Therefore, when strips 41 are not being produced, or when there is otherwise a delay in the band forming process, system 10 and/or generator 20 may be temporarily placed in an idle mode or temporarily stopped to reduce any unnecessary re-processing of input material to extend the life thereof. When in idle mode, sheet 21 may translate, and generator 20 may operate, at an idle speed. The idle speed may be any desired speed, which may be, for example, 2 m/min. When it is desired to form article 14, system 10 may operate in a production mode, where strips 41 are formed and applied at any desired speed, such as, for example, up to approximately 50 m/mm. System 10 may also operate in a ready mode, or at a speed greater than the idle speed and less than the production speed, such as, for example, 20 m/min. When switching between modes, the speed may slowly or methodically ramp up or down in an effort to prevent any tearing of sheet 21, which may result from abrupt changes in speed.

Figure 13:
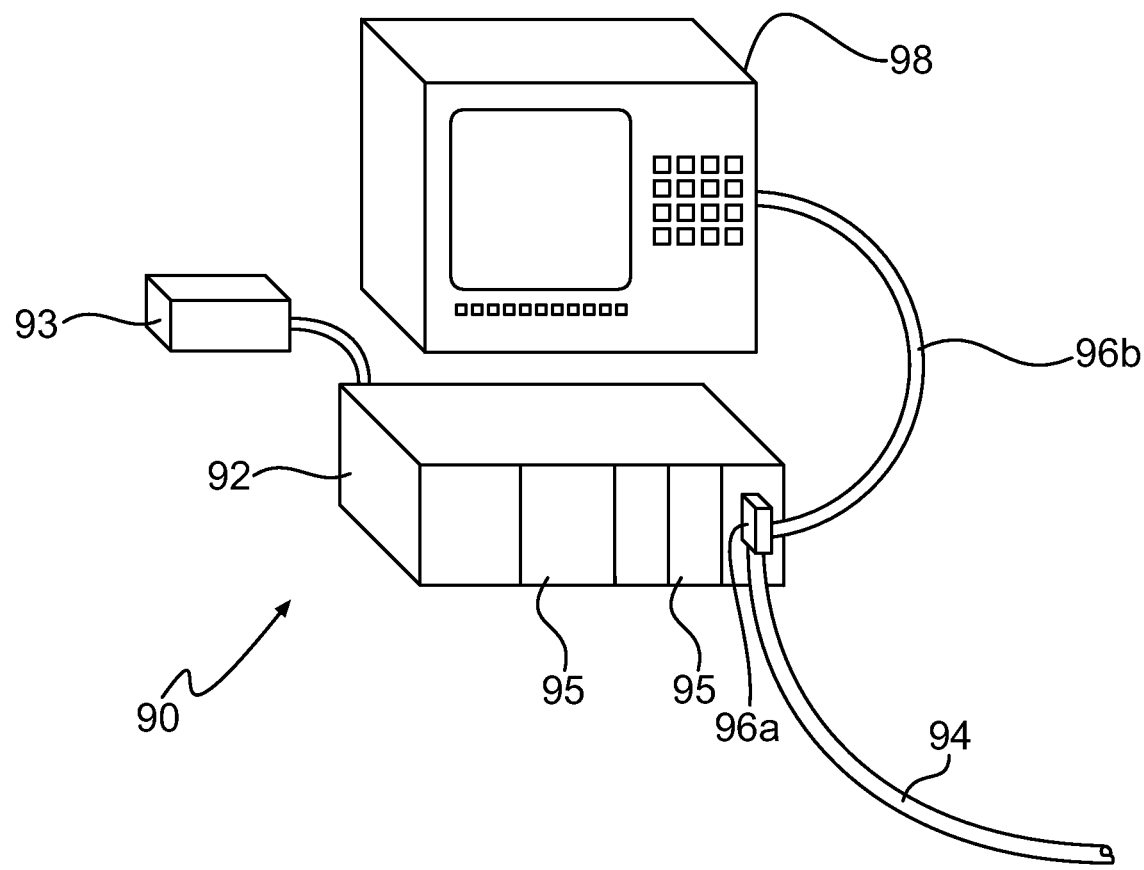
FIG. 13 is a perspective view of a programmable logic controller for use with the system shown in FIG. 1, according to an embodiment of the invention.

With reference to FIG. 13, system 10 may include a programmable logic controller 90, or other device having a processor that can execute programmed instructions, such as, for example, a personal computer or main frame computer. System 10 may also include a user interface 98. Controller 90 generally receives input and/or instructions to control system 10 and the operation of each assembly thereof, which includes the generation and translation of sheet 21 through system 10, the cutting and application of strips 41, and the recovery and manipulation of recovered sheet 21 for regeneration. Controller 90 may include a logic processor 92 (which may be a microprocessor), a memory storage device 93, such as RAM (random access memory), ROM (read-only memory), PROM (programmable read-only memory), and at least one input/output (I/O) cable 94 for communicating with system 10. Further, controller 90 may include an I/O slot 95 for housing an I/O card having I/O cable connector 96. An operator may utilize a user-interface 98 to provide input to, and/or to control or instruct the operation of, controller 90 and system 10, which includes performing each step and method associated with forming and translating a sheet 21, cutting strips 41 there from, and applying the strips 41 to a building surface for assembling a wrapped component 14. User-interface 98 and controller 90 may communicate by way of I/O cable 96. It is also contemplated that wireless communications may exist between controller 90, user-interface 98, and system 10. Generally, controller 90 may be programmed by any known graphical or text language. Programmed instructions, data, input, and output may be stored in a memory storage device 93, which is accessible to processor 92. Memory device 93 may comprise any commercially known storage device, such as such as hard disk drives, optical storage devices, flash memory, and the like. Processor 92 executes programmed instructions and may perform the instructions and any calculations and/or measurements useful for controlling system 10 and performing the methods and operations discussed herein. Memory storage device 93 also stores inputs, outputs, and other information, such as, the geometry and location of any drum 52, 62, 104, building surface 100, and/or cutting members 42, as well as the desired speed for the translation and formation of sheet 21. As stated earlier, controller 90 may be in communication with an axis motion controller to coordinate the operation of cutting members 42 by way of translation members 44, extension members 47, and/or rotation members 48. Further, controller 90 may be in communication with each of the cutting drum 52, applicator drum 62, building surface 100, and/or building drum 104, and is therefore able to determine the rotational position of each such drum during rotation thereof.

The above describe apparatus (i.e., system or machine) performs particular embodiments of methods for forming an article upon an axially tapered building surface. Particular embodiments of such methods may include the step of providing a mechanical system, such as, for example, the system 10 discussed above, and any variation thereof. The system may include a plurality of cutting members. Cutting members may form rotating knives, or any other device or apparatus capable of cutting, lacerating, or perforating the sheet to form a strip, or any other member discussed above in association with cutting assembly 40. The system may also include an application surface for transferring material to the axially tapered building surface, wherein the axially tapered surface comprises a surface of revolution that varies radially along a rotational axis of the surface. Building surface is an axially tapered surface, and particular instances, forms a frusto-conical surface. In yet other instances, axially tapered building surface is a surface of a tire, and the article is a tire component.

In particular embodiments of the system, application surface is also an axially tapered surface. Application surface may form a frusto-conical surface, a zone-shaped surface, or a portion of a torus. In other variations, when building surface and/or application surface may form any other axially tapered surface, such as, for example, a spheroid, a circular paraboloid, a hyperboloid, or any other surface contemplated above with reference to system 10. Either surface may be adapted to provide improved adhesion for maintaining the sheet and/or any strips upon such surface as desired. A surface having improved adhesion may be achieved by any known means, including those disclosed above with regard to application surface 64 and building surface 100, or any other roller or drum.

Particular embodiments of such methods may also include the step of translating a sheet of material along a translation path through the mechanical system. In particular instances, translating along a translation path includes translating through a roller assembly, a cutting assembly, and/or an applicator assembly. Translation along such path may also include translating from a sheet generator and/or along a recovery assembly for return to sheet generator. Translation along path may also occur as contemplated above with reference to system 10.

Particular embodiments of such methods may further include cutting a strip of material from the sheet with one or more of the plurality of cutting members during the step of translating. In more specific instances, the step of cutting may include cutting one or more laterally extending cutting paths into the sheet of material with one or more of the plurality of cutting members to form a leading edge of the strip, cutting a one or more side cutting paths extending from the leading edge to form a width of the strip, and cutting one or more laterally extending cutting paths from the side paths to form a trailing edge of the strip. Sheet may also be cut in any other manner, such as, for example, any manner contemplated above in association with cutting assembly 40.

Particular embodiments of such methods may further include mechanically transferring the strip of material from the application surface to the axially tapered building surface, the axially tapered building surface rotating about an axis of rotation during the step of translating. In other words, application surface applies or transfers strip to a rotating building surface. In more specific instances, the step of mechanically transferring the strip of material includes placing the strip into pressurized contact against the building surface by translating at least one of the building surface and the application surface toward the other. In certain instances, the application surface retracts from the building surface while maintaining the strip in pressurized contact against the axially tapered building surface. In lieu of maintaining a pressurized contact, the application surface may retract from the building surface to place the strip of material in tension [as it is being transferred from the application surface to the building surface]. Other methods of applying strips to building surface may be employed, such as those contemplated above in relation to applicator assembly 60.

Particular embodiments of such methods may also include the steps of introducing input material into a sheet generator, and forming the sheet of material with the sheet generator. Sheet generator may comprise any means of forming a sheet of material, such as, for example, a calendar or extruder. Input material may comprise any material, such as, for example a polymer or elastomer, or any material contemplated above. It follows that in particular instances, such methods may include the step of mechanically translating the sheet about a closed-loop path, the path extending from the sheet generator and returning to the sheet generator for reuse as input material. Accordingly, input material may comprise new material and/or previously used sheet (recycled material). New material may be added as necessary with recycled material. Used sheet may be obtained, in particular embodiments of such methods, by performing the step of recovering the remaining portion of the sheet after cutting the strip from the sheet with a conveyor having a variable speed surface. In particular instances, the variable surface speed conveyor comprises a plurality of independent belts positioned axially along a tapered roller. Other conveyors contemplated above in association with recovery assembly 70 may be used with these and other methods.

When a operating along a closed-loop path, it is possible to vary the formation and translation rate of the continuous sheet. Accordingly, reducing or stopping the translation of sheet, such as, for example, when forming or applying any strips has ceased, less material may be reprocessed, which may extend the life of the sheet material if less work is performed by sheet generator upon such material. Accordingly, the methods may also include the steps of translating the sheet at a first speed during the step of mechanically applying or transferring one or more strips, and translating the sheet at a second speed when not performing the step of applying or transferring one or more strips, the second speed being less than the first speed. In certain instances, the first speed may be upwards of 50 meters per minute, or more, and the second speed may be 2 meters per minute or less. The second speed may also be 0 meters per minute, whereby a temporary pause is provided. The duration of the temporary pause in sheet generation and translation may be limited in time based upon the particular composition and type of generator being used, so to limit the material's exposure to work and/or heat before the material begins to degrade or alter. When an article is completely formed, there may be a delay while the completed article is being removed and another building surface returned for subsequent assembly of another article. Accordingly, the methods may also include the step of terminating the step of forming one or more strips after the tire component has been formed, while the sheet continues to translate about the closed-loop path. Subsequently, the new article may be formed on the building surface by repeating particular steps of the methods.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method of forming a tire component upon an axially tapered building surface, the method comprising the steps of:
   providing a mechanical system, the system including a plurality of cutting members and an axially tapered application surface for transferring material to the axially tapered building surface, each of the axially tapered application surface and the axially tapered building surface comprising a surface of revolution that varies radially along a rotational axis of each surface;
   translating a sheet of material along a translation path through the mechanical system, the translation path comprising a closed-loop path extending from a sheet generator and returning to the sheet generator for reusing at least a portion of the sheet as input material;
   cutting a strip of material from the sheet with one or more of the plurality of cutting members during the step of translating by forming at least one or more cuts to define a width of the strip, the strip of material being cut from the sheet along the axially tapered application surface; and, transferring mechanically the strip of material from the axially tapered application surface to the axially tapered building surface, each of the axially tapered application surface and the axially tapered building surface rotating during the step of transferring, where the step of translating includes transferring a remaining portion of the sheet of material to a recovery assembly after cutting the strip from the sheet, wherein said recovery assembly transfers the remaining portion from the axially tapered application surface and to the sheet generator for use as input material for continuous formation of the sheet of material, said recovery assembly comprising a variable surface speed conveyor configured to variably translate the remaining portion along the translation path, where the speed of the conveyor varies laterally across a width of the conveyor.

2. The method of claim 1, wherein the axially tapered building surface is a sidewall portion of a tire.

3. The method of claim 1, wherein the axially tapered building surface forms a conical surface, frusto-conical surface, a torus, or zone-shaped surface.

4. The method of claim 1, wherein the application surface forms a conical surface or a frusto-conical surface.

5. The method of claim 1, wherein the step of mechanically transferring the strip of material includes placing the strip into pressurized contact against the building surface by translating at least one of the building surface and the application surface toward the other.

6. The method of claim 5, wherein the application surface retracts from the building surface while maintaining the strip in pressurized contact against the axially tapered building surface.

7. The method of claim 5, wherein the application surface retracts from the building surface to place the strip of material in tension.

8. The method of claim 1, wherein the plurality of cutting members includes a pair of cutting members such that the step of cutting a strip of material from the sheet with one or more of the plurality of cutting members comprises cutting the strip from the sheet using the pair of cutting members, the pair of cutting members forming a first end of the strip, a pair of opposing sides of the strip defining a width of the strip, and a second end of the strip, the first and second ends defining a length of the strip with the pair of opposing sides extending between the first and second ends.

9. The method of claim 1, wherein the variable surface speed conveyor comprises a plurality of independent belts positioned axially along a tapered roller.

10. The method of claim 9, wherein each of the one or more belts also extends about an independent pulley.

\* \* \* \* \*